Figure 1:
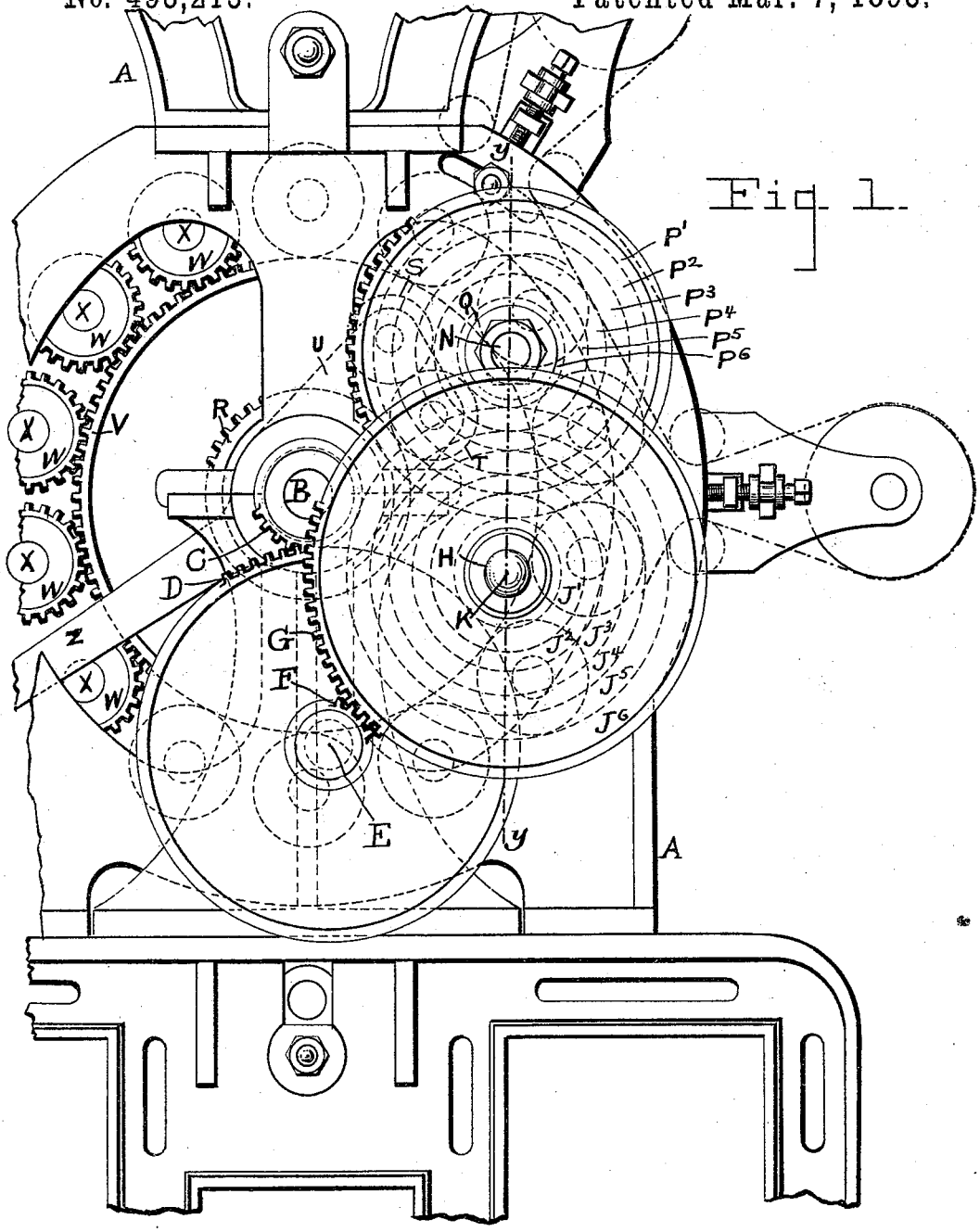

(No Model.) 5 Sheets—Sheet 1.
W. T. LEECH & G. HIMELSPARK.
CLOTH NAPPING MACHINE.
No. 493,215. Patented Mar. 7, 1893.

WITNESSES:
Wm. C. Wiedersheim.
Richard H. Graeser.

INVENTORS:
William T. Leech
George Himelspark
BY John A. Wiedersheim
ATTORNEY.

(No Model.) 5 Sheets—Sheet 3.
W. T. LEECH & G. HIMELSPARK.
CLOTH NAPPING MACHINE.

No. 493,215. Patented Mar. 7, 1893.

WITNESSES:
Wm. C. Wiedersheim.
Richard F. Graeser.

INVENTORS:
William T. Leech
George Himelspark
By John A. Wiedersheim
ATTORNEY.

(No Model.) 5 Sheets—Sheet 4.

W. T. LEECH & G. HIMELSPARK.
CLOTH NAPPING MACHINE.

No. 493,215. Patented Mar. 7, 1893.

WITNESSES:
Wm. C. Wiedersheim,
Richard H. Graeser.

INVENTORS:
William T. Leech
George Himelspark
BY John A. Wiedersheim
ATTORNEY.

(No Model.) 5 Sheets—Sheet 5.
W. T. LEECH & G. HIMELSPARK.
CLOTH NAPPING MACHINE.
No. 493,215. Patented Mar. 7, 1893.
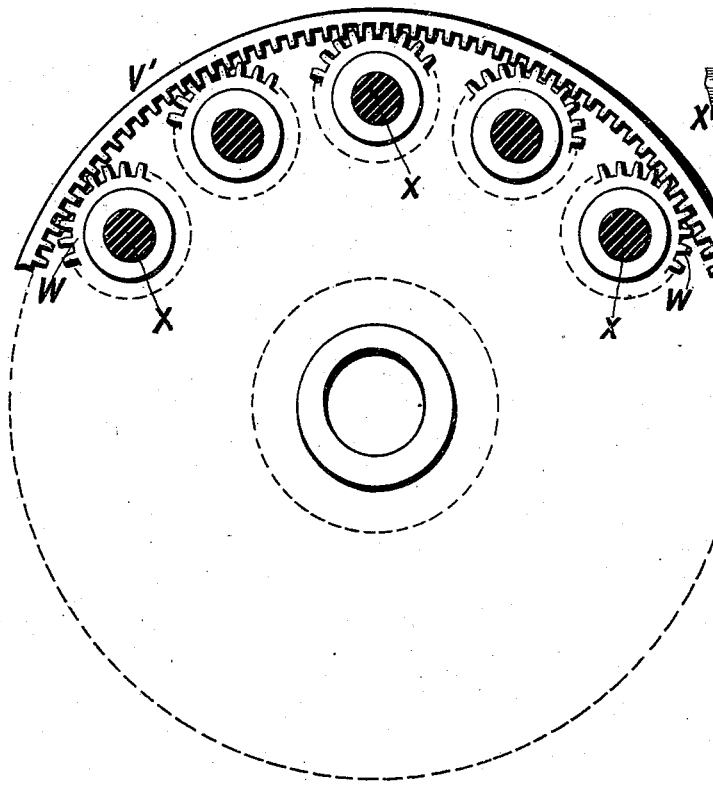
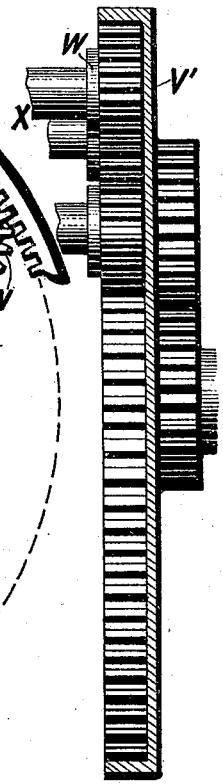

UNITED STATES PATENT OFFICE.

WILLIAM T. LEECH AND GEORGE HIMELSPARK, OF PHILADELPHIA, PENNSYLVANIA, ASSIGNORS, BY MESNE ASSIGNMENTS, TO THE AMERICAN NAPPING MACHINE COMPANY, OF MAINE.

CLOTH-NAPPING MACHINE.

SPECIFICATION forming part of Letters Patent No. 493,215, dated March 7, 1893.

Application filed March 17, 1892. Serial No. 425,262. (No model.)

*To all whom it may concern:*

Be it known that we, WILLIAM T. LEECH and GEORGE HIMELSPARK, citizens of the United States, both residing in the city and county of Philadelphia, State of Pennsylvania, have invented a new and useful Improvement in Cloth-Napping Machines, which improvement is fully set forth in the following specification and accompanying drawings.

Our invention relates to improvements in napping or gigging machines of the character where the napping is accomplished by the contact of the cloth with a series of carding or napping rolls which rotate on their own axes, and at the same time rotate around a common axis, around which the carding or napping rolls are arranged.

The object of the invention is to secure a positive rotation of all the napping rolls so as at all times to insure an amount of work from each roll according to the speed at which it is rotated.

Heretofore so far as known, the napping or carding rolls in machines of the class described, have been driven either by friction pulleys pressing against the inner surface of a ring, or by a belt embracing the whole series of rolls, and in consequence of frequent slippings, giving a variable and intermittent rotation to the said rolls and consequently a variable amount of nap on the surface of the material being treated.

To remedy this defect our invention consists:—first, of a train of gearing driven from a central shaft around which the rolls are journaled and adapted to rotate the said rolls on their own axes, as well as around the central shaft.

It further consists of means connected with said train of gearing for changing the speed of the rolls.

It further consists of means substantially as described connected with said train of gearing for reversing the direction of the motion of the rolls.

It further consists of the combination and arrangement of parts hereinafter set forth.

Figure 2:
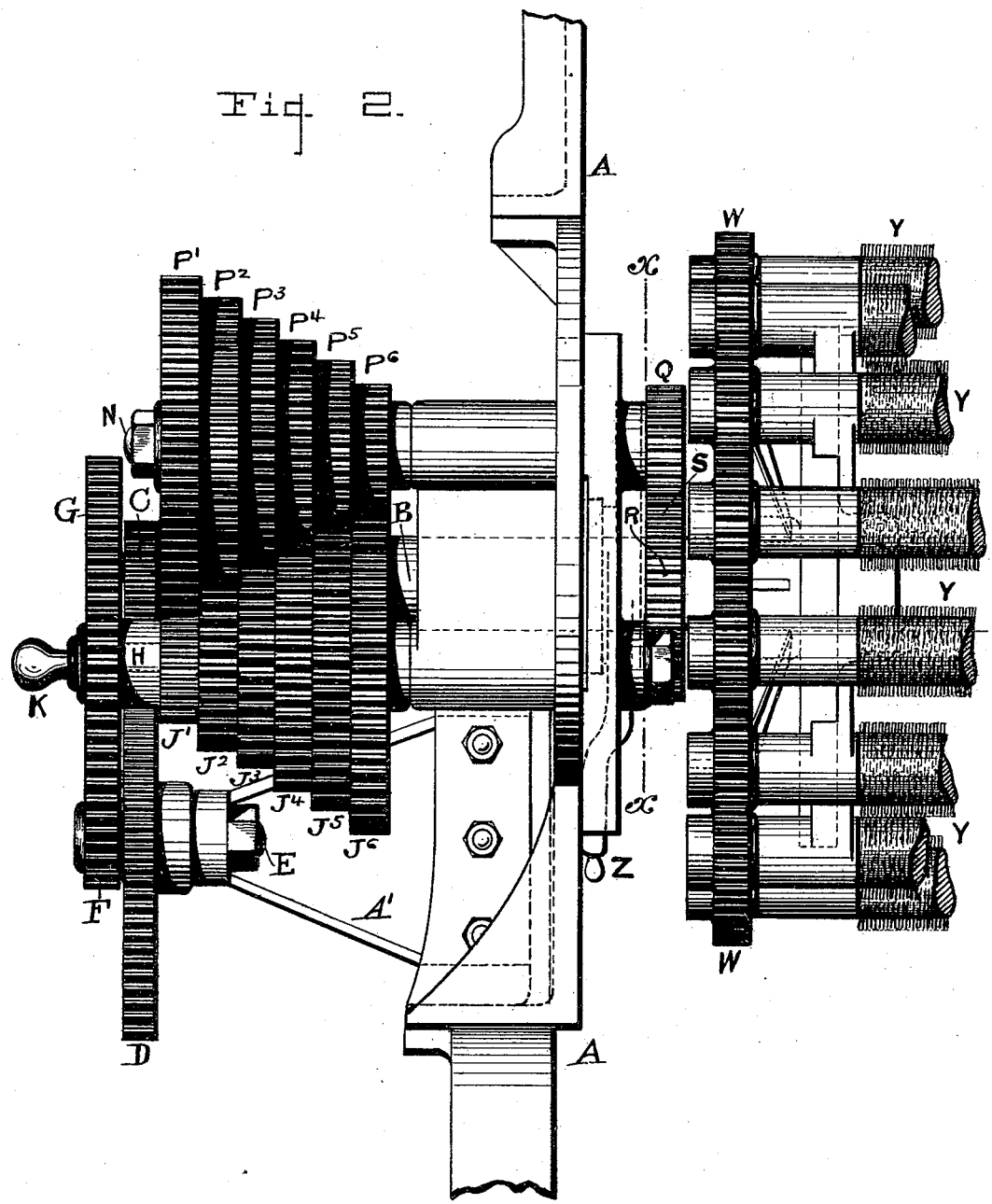
Figure 3:
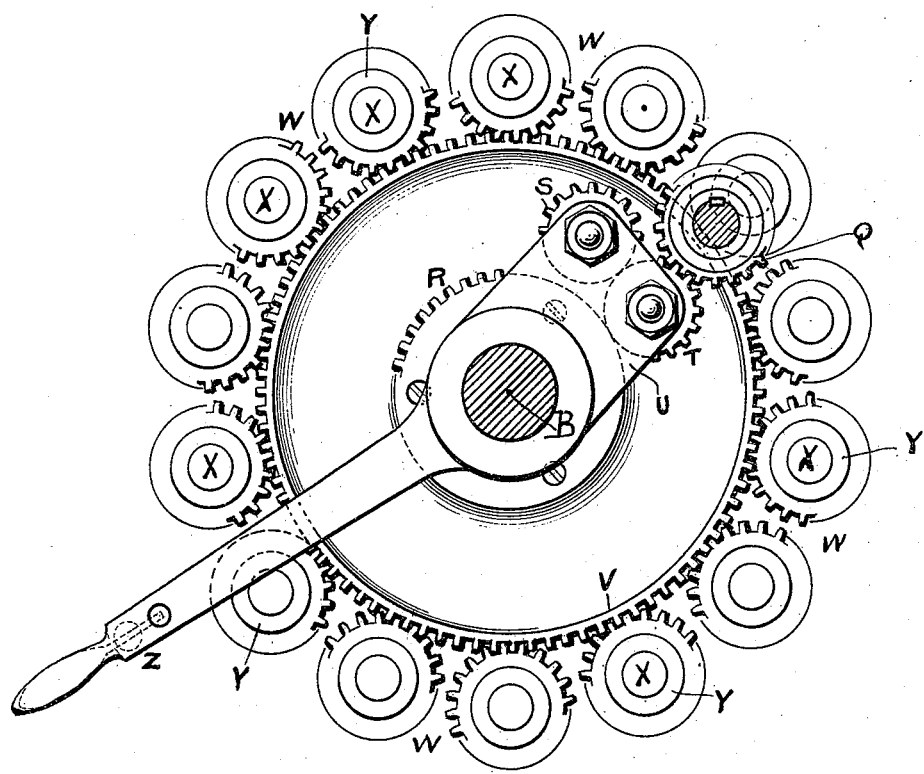
Figure 4:
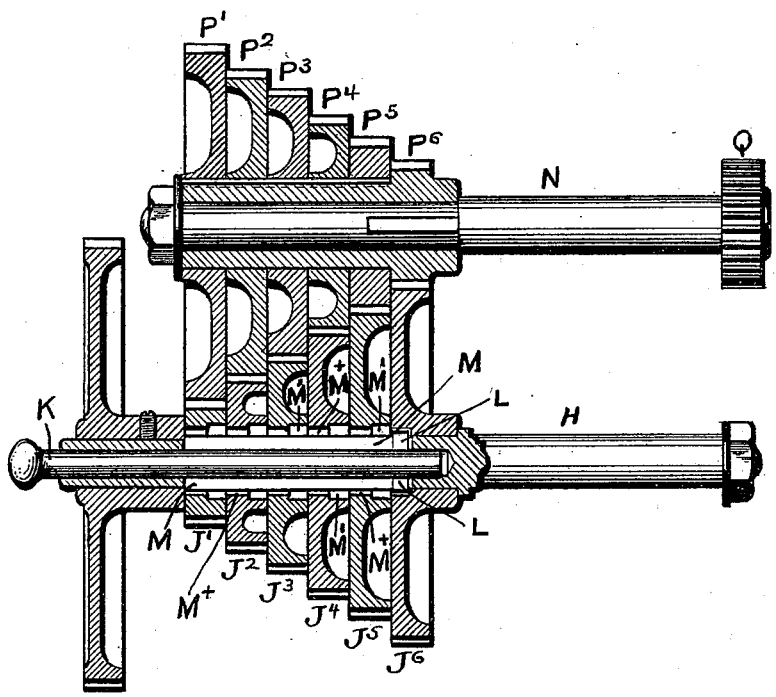

Figure 1 represents an end elevation of part of a napping or gigging machine embodying our invention. Fig. 2 represents a view of the same at right angles to that shown in Fig. 1. Fig. 3 represents a vertical section on line $x$, $x$, Fig. 2, showing the mechanism for reversing the direction of rotation of the rolls. Fig. 4 represents a sectional view on line $y$, $y$, Fig. 1, and Figs. 5 and 6 represent face and side views of another form of driving the napping or carding rollers.

Similar letters of reference indicate corresponding parts in the several figures.

Referring to the drawings: A designates the frame of the machine in which is journaled the main driving shaft B. Keyed on the said shaft is a pinion C, which meshes with a gear wheel D, mounted on the short shaft or stud E, the latter being supported in an attachment A' of the frame A.

Mounted on the shaft E, so as to rotate with the gear wheel D, is a pinion F, which meshes with a gear wheel G, on a shaft H, also journaled in the frame A. Loosely mounted on the shaft H are a series of gear wheels, six in number, $J'$, $J^2$, $J^3$, $J^4$, $J^5$, $J^6$, of different diameters. The number of wheels may be either more or less than shown, if so desired. Either one of the said wheels $J'$, $J^2$, $J^3$, $J^4$, $J^5$, and $J^6$, is locked to the shaft H, so as to rotate therewith by means of a bar K, which is movable endwise in a longitudinal recess in the shaft, and is provided with the feathers L, on its opposite sides, the said feathers being adapted to move in the slots M in the said shaft H, and when in the recesses $M^\times$ of a wheel, to key the same to the shaft. To readily permit the drawing of the feathers from the recesses $M^\times$, each wheel has a circular groove M' in its hub, surrounding the shaft and in communication with the recesses $M^\times$, which latter are of sufficient size to allow the feathers to fit snugly therein, while the groove M' is large enough to permit the entire withdrawal of the feathers from the recesses $M^\times$ of one wheel before inserting them into the recesses of an adjacent wheel.

Keyed on a shaft N, which is parallel with the shaft H, and also journaled in the frame A, are a number of gear wheels $P'$, $P^2$, $P^3$, $P^4$, $P^5$, and $P^6$, of different diameters so as to engage with the gear wheels $J'$, $J^2$, $J^3$, $J^4$, $J^5$, and $J^6$, and be rotated by the one thereof which has been secured to the shaft H.

A pinion Q, is keyed on the shaft N, and communicates motion in either direction to a gear wheel R, loosely mounted on the main driving shaft B, by means of the two meshing pinions S and T, which are journaled on a frame U, pivoted on the shaft B, and provided with a lever or handle Z for moving the same. The said wheels S and T are so located that when the frame is raised, the wheel T meshes with the pinion Q and the gear wheel R, the wheel S being free from said pinion and gear wheel, but when the frame is lowered, the pinion S meshes with the pinion Q, and the pinion T meshes with the gear wheel R, so that the direction of rotation of the said gear wheel R is reversed from what it was when the frame was raised.

Mounted on the shaft B, and rotatable with the wheel R is a large gear wheel V, which engages the pinions W on the journals X of the napping rolls Y, which latter are parallel with the shaft B, and surround the same.

The other parts of the machine are of any ordinary and well known construction, and not being any part of the invention are not described or claimed herein.

It will be seen that owing to the gearing J', $J^2$, $J^3$, $J^4$, $J^5$, and $J^6$, being of different diameters, different speeds can be imparted to the gear P', $P^2$, $P^3$, $P^4$, $P^5$, and $P^6$, and thus to the shaft N, and thereby to the napping rolls, the speed of the shaft E being undisturbed, the greatest speed being obtained when the wheel $J^6$ is locked to the shaft H, and the least speed when the wheel J' is keyed to the said shaft, and intermediate speeds by keying either of the intermediate wheels to the shaft. By making the gear wheels and pinions of raw hide, a high rate of speed may be maintained without making any noise with the same. Other noiseless material as wood, may be used for the wheels if so desired.

The manner of the operation of the gearing is readily understood. Motion is communicated to the napping or carding rolls from the main shaft through the train of gearing described, the speed being regulated by keying the proper wheel on the shaft H, and the direction of motion of the rolls being reversed when desired by operating the frame U. We may also drive the napping or carding rolls by gearing the same to an internally toothed wheel V', see Figs. 5 and 6, so that said rolls may be rotated in either direction, either by an externally toothed wheel as hereinbefore described, or by an internally toothed wheel just above stated, said wheels rotating in opposite directions. It will be seen that we secure positive and uniform rotation of the napping rolls, and the direction of rotation and speed of said rolls being changeable at will, and changeable instantly while running, in contradistinction to napping machines heretofore constructed. In one class of such machines, the rollers are operated by a belt which embraces the rolls, and are only driven during a portion of a revolution, while in another class the rolls are driven by reason of frictional contact with a metal or other ring.

Having thus described our invention, what we claim as new, and desire to secure by Letters Patent, is—

1. In a napping or gigging machine, napping rolls, a main shaft having a train of gearing connected therewith, a number of gear wheels of different diameters loosely mounted on a shaft in said train, means for keying either of said loose gear wheels on said shaft, a shaft having wheels meshing with said gear wheels and a train of gearing connecting said shaft with the napping rolls, said parts being combined substantially as described.

2. In a napping or gigging machine napping rolls, a main shaft with a train of gearing connected therewith, a train of gearing connected with the napping rolls and a pivotal frame carrying two meshing pinions adapted to receive motion from said first mentioned train and impart the same in either of two opposite directions according to the position of said frame, said parts being combined substantially as described.

3. In a napping or gigging machine napping rolls, a main shaft around which the napping rolls are located, a train of gearing connected with said main shaft, a train of gearing connected with the napping rolls, mechanism in said train for imparting different speeds to a pinion on a shaft thereof, and mechanism connecting said trains of gearing for reversing the motion of direction of the rolls, said parts being combined substantially as described.

4. In a napping or gigging machine, a main driving shaft with a gear wheel thereon, napping rolls connected by gearing with said gear wheel on the main shaft, a rotary pinion and a pivoted frame carrying two meshing pinions adapted to engage with said rotary pinion and the gear wheel on the main shaft so as to convey motion to the said napping rolls in reverse directions, said parts being combined substantially as described.

5. In a napping or gigging machine, a frame, napping rolls, a shaft with a series of cog wheels of different sizes loosely mounted thereon, means substantially as described for securing either one of said wheels to said shaft, a shaft with a series of cog wheels secured thereon, and meshing with said first mentioned series, a pinion on the last mentioned shaft, and mechanism substantially as described adapted to gear with said pinion for driving the rolls in either of opposite directions, said parts being combined substantially as described.

WILLIAM T. LEECH.
GEORGE HIMELSPARK.

Witnesses:
JOHN A. WIEDERSHEIM,
A. P. JENNINGS.